June 7, 1949. C. J. ROCQUIN 2,472,342
RAKE
Filed May 20, 1946
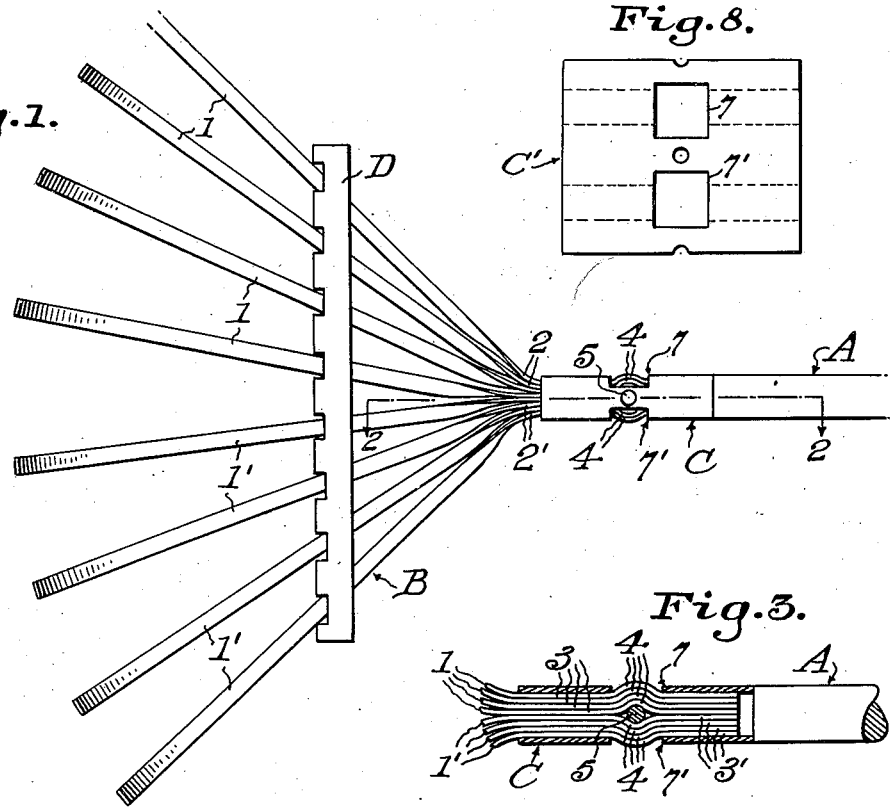
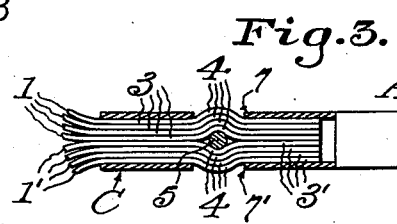
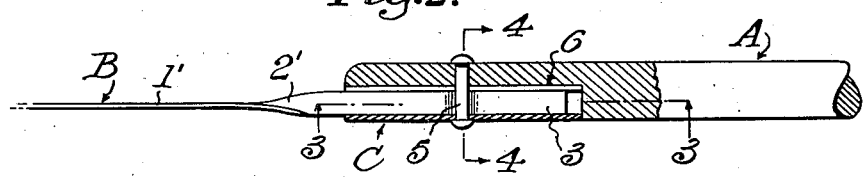
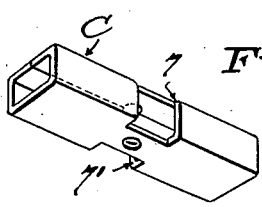
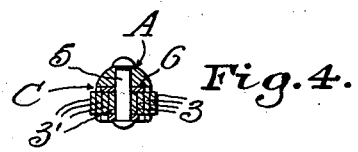
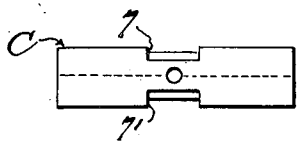
INVENTOR.
Camille J. Rocquin
BY Baldwin + Wight
his ATTORNEYS

UNITED STATES PATENT OFFICE 2,472,342

RAKE

Camille J. Rocquin, New Orleans, La.

Application May 20, 1946, Serial No. 670,987

7 Claims. (Cl. 56—400.17)

This invention relates to rakes, and more particularly to so called "broom rakes" of the kind on which a plurality of separate tines, usually formed of flexible metal pieces, are grouped together at their inner end portions for attachment to a handle.

An object of the invention is to provide a rake of the character referred to including a novel and improved arrangement of parts for connecting the tines securely to the rake handle.

Another object of the invention is to provide a rake of the kind referred to in which a secure, lasting attachment of the tines to the handle is effected by nesting lateral projections on the inner end portions of the tines in such a manner that the tines themselves hold each other against longitudinal displacement.

A further object of the invention is to provide such a rake with a simple and effective attaching member for securely holding the tines in such nested relationship and for connecting the bunched tine inner end portions to the handle.

Other objects will become apparent from a reading of the following description, the appended claims, and the accompanying drawing, in which:

Figure 1 is a bottom plan view of a rake embodying the invention;

Figure 2 is a section on the line 2—2 of Figure 1;

Figure 3 is a section on the line 3—3 of Figure 2;

Figure 4 is a section on the line 4—4 of Figure 2;

Figure 5 is a perspective view of a box-like member for attaching the rake tines to the handle;

Figure 6 is a side elevation of the member shown in Figure 5;

Figure 7 is a bottom plan view of the attaching member; and

Figure 8 is a plan view showing one form of blank from which the member shown in Figures 5, 6 and 7 may be formed.

In its general nature, the illustrative embodiment of the invention comprises a handle A, rake head generally designated B, and a fastening member C for attaching the rake head B to the handle A. The head B comprises a plurality of springy sheet metal strips forming flexible tines. The tines may be considered as being in two sets, one set comprising a plurality of tines 1—1 shown above the section line 2—2 in Figure 1; and the other set comprising a plurality of tines 1'—1' shown below the section line in Figure 1. Thus, the two sets of tines are positioned respectively on opposite sides of the axis or longitudinal center line of the handle A.

The tines 1 and 1' are twisted at 2 and 2' respectively in front of the member B, and their outer or front end portions extend forwardly and diverge in fan-like deployment, in which they are held by a spreader bar D of any conventional or suitable form.

The inner end portions 3 and 3' of the respective tines 1 and 1' are arranged in general parallelism with the handle A and are attached to the latter in a novel, effective manner. The inner end portions of the tines of each set are bunched together for group attachment to the handle, and preferably the two groups of inner end portions 3 and 3' are placed together in assembly. In accordance with the invention, the inner portions 3 of one set of tines 1 are deformed laterally intermediate their lengths, preferably by being smoothly curved outwardly at 4 as best shown in Figure 3. The deformed portions 4 provide anchoring portions which are mutually nested so that the tine inner end portions 3 cannot move individually in a direction parallel to the handle A. The end portions 3' of the other set of tines 1' are deformed or curved laterally oppositely to the deformed portions 4 to provide mutually nested anchoring portions 4'.

The two groups of tine inner end portions 3 and 3' are embraced by the box-like fastening member C which is secured to the handle A by a suitable fastener, preferably of the pin type, for example a screw or bolt or, as shown, a rivet 5. Appearance of the assembled rake is enhanced by providing the handle A with a cut out seat 6 on which the fastening member C is secured by the fastener 5.

In accordance with another feature of the invention, the member C is formed in a novel manner so as to have interlocking engagement with the outermost anchoring portions 4 and 4' of the tine inner end portions 3 and 3'. In the form shown, the member C is formed with opposed side wall openings 7 and 7' providing seats respectively adapted to receive the outermost anchoring portions 4 and 4'. The seats provided by the openings 7 and 7' hold the respective outermost tine inner end portions 3 and 3' against longitudinal movement; and because of the bunched and mutually nested relationship of the other anchoring portions 4 and 4', all of the tine inner end portions are held securely in place.

For convenience in assembling the parts, the member C may be formed from a flat blank C' as shown in Figure 8. The blank can then be bent around the bunched tine inner ends so as to have the box-like forms shown in Figures 5, 6 and 7. Preferably the rivet 5 passes between the anchoring portions 4 and 4' of the two innermost tine inner end portions 3 and 3', thus serving not only to secure the tines and the member C to the handle A, but also to hold the sets of anchoring portions 4 and 4' in position with respect to the openings 7 and 7'.

The broom type rake shown in the drawing embodies the invention in the form now preferred, but it will be apparent that changes may be made without departing from the invention as defined in the claims.

I claim:

1. In a rake, the combination with a handle of a plurality of tines extending from the handle and having inner end portions bunched together for group attachment to said handle, each of said tine inner end portions being laterally deformed to provide an anchoring element, having an indentation on one side and a ridge on the opposite surface, the ridge of each element being complementary to the indentation of the adjacent element when said elements are mutually nested whereby the tines are held by each other against individual movement longitudinally of said tine inner end portions; and a fastening member secured to said handle and embracing said tine inner end portions and maintaining said anchoring elements in said nested relationship.

2. In a rake, the combination with a handle of a plurality of tines extending from the handle and having inner end portions bunched together for group attachment to said handle, said tine inner end portions extending generally parallel to said handle but having, intermediate their lengths, concavo-convex anchoring portions which are mutually nested whereby the tines are held by each other against individual movement longitudinally of said tine inner end portions; and a fastening member secured to said handle and embracing said tine inner end portions and maintaining the concavo-convex anchoring portions thereof in said nested relationship.

3. In a rake, the combination with a handle of a plurality of tines extending from the handle and having inner end portions bunched together for group attachment to said handle, each of said tine inner end portions being laterally deformed to provide an anchoring element, having an indentation on one side and a ridge on the opposite surface, the ridge of each element being complementary to the indentation of the adjacent element when said elements are mutually nested whereby the tines are held by each other against individual movement longitudinally of said tine inner end portions; and a box-like member secured to said handle and embracing said tine inner end portions, at least one wall of said member having an opening into which an outermost one of said anchoring elements extends to lock the nested anchoring elements and thereby the tine inner portions against displacement longitudinally with respect to the handle.

4. In a rake, the combination with a handle formed at one of its ends with a cut out seat of a plurality of tines extending from the handle and having inner end portions bunched together for group attachment to said handle, each of said tine inner end portions being laterally deformed to provide an anchoring element, having an indentation on one side and a ridge on the opposite surface, the ridge of each element being complementary to the indentation of the adjacent element when said elements are mutually nested whereby the tines are held by each other against individual movement longitudinally of said tine inner end portions; a fastening member positioned on said seat and embracing said tine inner end portions and being formed with an opening into which an outermost one of said anchoring elements projects laterally; and a pin-like fastener securing said member to said handle and being spaced laterally from said opening and in engagement with an innermost one of said anchoring elements.

5. In a rake, the combination of a handle, a plurality of tines extending from the handle and having inner end portions in two contiguous sets, each comprising a plurality of tine inner end portions, all of the tine inner end portions being bunched together for group attachment to said handle and the tine inner end portions of the respective sets having anchoring portions deformed laterally away from the division between the sets, the anchoring portions of each set being mutually nested whereby the tines are held by each other against individual movement longitudinally of said tine inner end portions; and a fastening member secured to said handle and embracing said tine inner ends and maintaining them in nested relationship.

6. In a rake, the combination of a handle; a plurality of tines extending from the handle and having inner end portions in two contiguous sets, each comprising a plurality of tine inner end portions extending generally parallel to said handle, all of the tine inner end portions being bunched together for group attachment to said handle and the tine iner end portions of the respective sets having, intermediate their lengths, anchoring portions deformed laterally away from the division between the sets, the anchoring portions of each set being mutually nested whereby the tines are held by each other against individual movement longitudinally of said tine inner end portions; and a fastening member secured to said handle and embracing said tine inner ends and being formed with opposed openings respectively receiving the anchoring portions of the outermost tine inner end portions of said two sets.

7. In a rake the combination of a handle; a plurality of tines extending from the handle and having inner end portions in two contiguous sets each comprising a plurality of tine inner end portions extending generally parallel to said handle, all of the tine inner end portions being bunched together for group attachment to said handle and the tine inner end portions of the respective sets having, intermediate their lengths, outwardly curved anchoring portions extending laterally away from the division between the sets, the anchoring portions of each set being mutually nested whereby the tines are held by each other against individual movement longitudinally of said tine inner end portions, a box-like member secured to said handle and embracing said tine inner end portions, said member being formed with two opposed openings respectively receiving the anchoring portions of the outermost tine inner end portions of said sets; and a pin-like fastener securing said box-like member to said handle and extending between the anchoring portions of the innermost tine inner end portions of said sets.

CAMILLE J. ROCQUIN.

REFERENCES CITED

The following references are of record in the file of this patent:

UNITED STATES PATENTS

| Number | Name | Date |
|---|---|---|
| 1,544,661 | Lay | July 7, 1925 |
| 1,610,842 | Young | Dec. 14, 1926 |
| 1,680,593 | Conley | Aug. 14, 1928 |